United States Patent
Shibata

(10) Patent No.: US 9,176,607 B2
(45) Date of Patent: Nov. 3, 2015

(54) INPUT/OUTPUT APPARATUS FOR DISPLAYING SUPERPOSED IMAGES INCLUDING A HANDWRITTEN IMAGE

(71) Applicant: Sharp Kabushiki Kaisha, Osaka-shi, Osaka (JP)

(72) Inventor: Tetsuya Shibata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/165,874

(22) Filed: Jan. 28, 2014

(65) Prior Publication Data

US 2014/0212042 A1   Jul. 31, 2014

(30) Foreign Application Priority Data

Jan. 31, 2013   (JP) ................................. 2013-017478

(51) Int. Cl.
*G06K 9/00* (2006.01)
*G06F 3/0354* (2013.01)

(52) U.S. Cl.
CPC .................................. *G06F 3/03545* (2013.01)

(58) Field of Classification Search
CPC ............ G06F 3/03545; G06F 3/04883; G06F 3/0487; G06F 3/033; G06T 3/4038; G06T 11/60; G06K 9/222; H04N 1/3876; H04N 5/23238
See application file for complete search history.

(56) References Cited

U.S. PATENT DOCUMENTS

| | | | | |
|---|---|---|---|---|
| 5,327,342 A * | 7/1994 | Roy | | 345/467 |
| 6,339,431 B1 | 1/2002 | Ohmori et al. | | |
| 7,193,616 B2 * | 3/2007 | Stavely et al. | | 345/173 |
| 8,275,222 B2 * | 9/2012 | Hotta et al. | | 382/313 |
| 8,872,805 B2 * | 10/2014 | Matsumoto | | 345/179 |
| 2007/0154094 A1 * | 7/2007 | Lin et al. | | 382/187 |
| 2012/0192250 A1 * | 7/2012 | Rakan | | 726/2 |
| 2013/0321314 A1 * | 12/2013 | Oh et al. | | 345/173 |
| 2014/0212042 A1 * | 7/2014 | Shibata | | 382/188 |

FOREIGN PATENT DOCUMENTS

| | | |
|---|---|---|
| JP | 2000-113208 A | 4/2000 |
| JP | 2004-13318 A | 1/2004 |
| JP | 2006-164148 A | 6/2006 |

* cited by examiner

*Primary Examiner* — Amir Alavi
(74) *Attorney, Agent, or Firm* — Keating & Bennett, LLP

(57) ABSTRACT

When a handwritten image is input using a handwriting input device while an image based on any general data stored in a storage unit is being displayed on a display unit, the input/output apparatus displays a handwritten image in addition to the displayed image, and creates handwritten data including data specifying information specifying general data which is a basis for the displayed image. The input/output apparatus terminates the display of the handwritten image when the display of the image superposed by the handwritten image is terminated, and displays the image based on the data specified by the data specifying information included in the handwritten data when the handwritten image is displayed. This allows the association between the displayed image and the handwritten image to be saved and to easily be reproduced.

9 Claims, 12 Drawing Sheets

F I G. 5
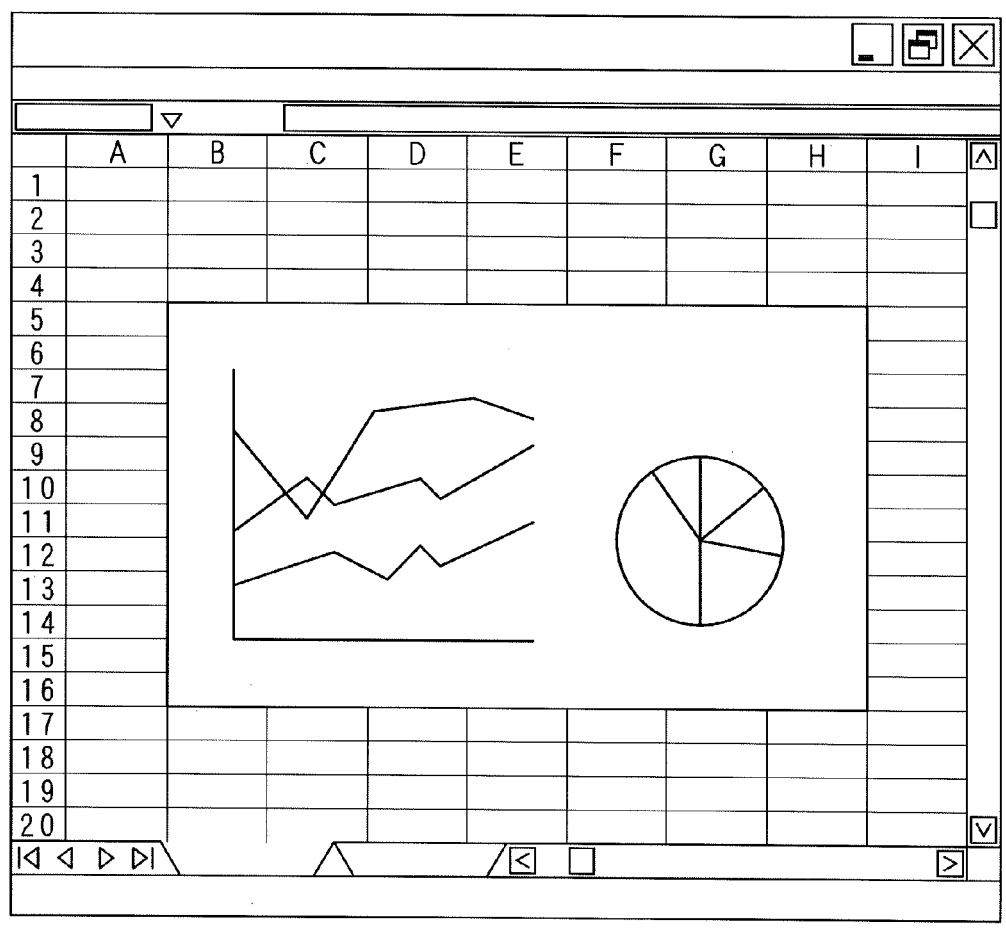

F I G. 7
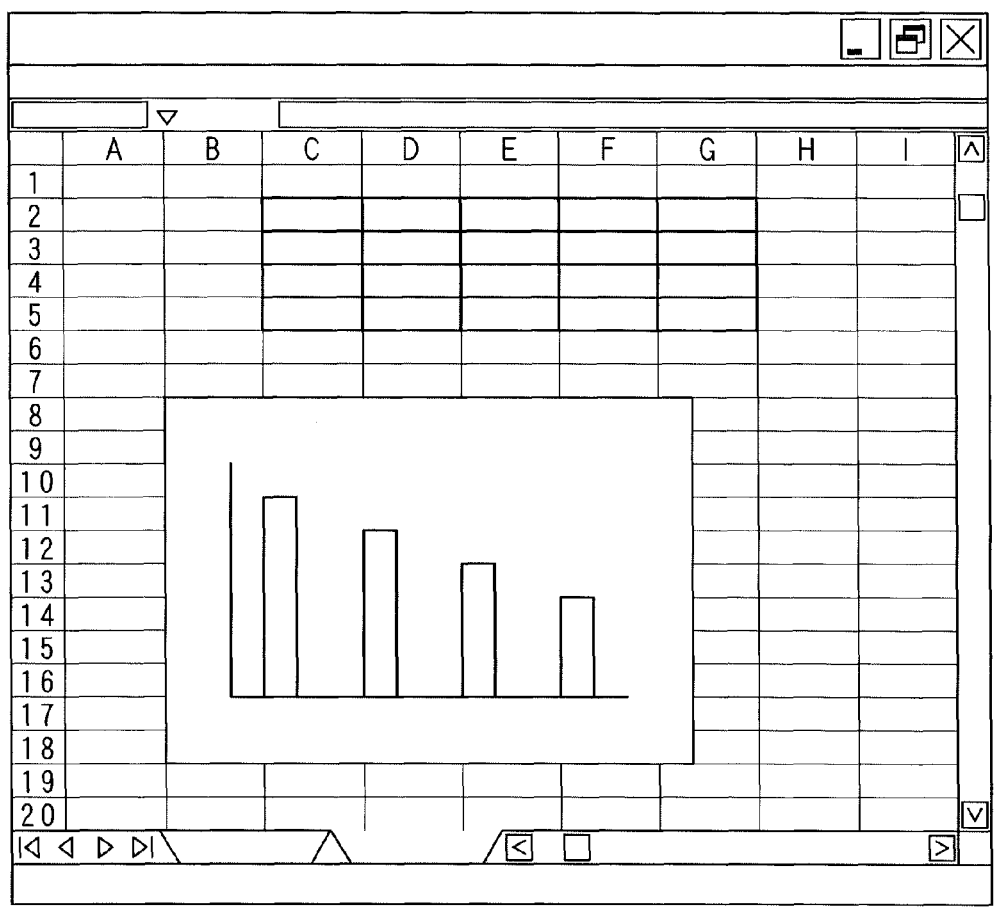

FIG. 9

| | | | | |
|---|---|---|---|---|
| HEADER | DATA ATTRIBUTES | FILE NAME | | |
| | | PATH FOR THE SAVING LOCATION | | |
| | | FILE TYPE | | |
| | | THE TOTAL NUMBER OF PAGES | | |
| | HANDWRITING ATTRIBUTES | FILE NAME | | |
| | | PATH FOR THE SAVING LOCATION | | |
| | | THE TOTAL NUMBER OF PAGES | | |
| | | OBJECT INFORMATION | OBJECT 1 | PAGE NUMBER |
| | | | | COORDINATE |
| | | | OBJECT 2 | PAGE NUMBER |
| | | | | COORDINATE |
| | | | OBJECT 3 | PAGE NUMBER |
| | | | | COORDINATE |
| | | | ⋮ | |
| OBJECT DATA | OBJECT 1 | DATA | | |
| | OBJECT 2 | DATA | | |
| | OBJECT 3 | DATA | | |
| | ⋮ | | | |

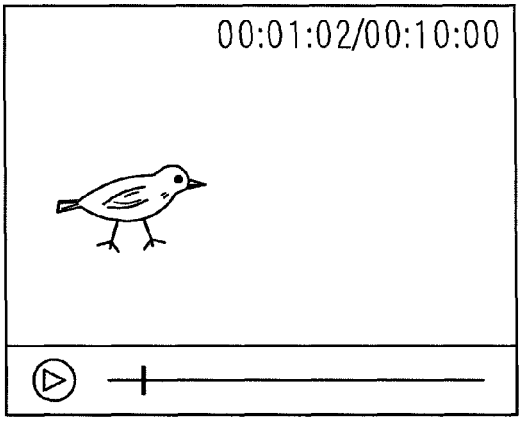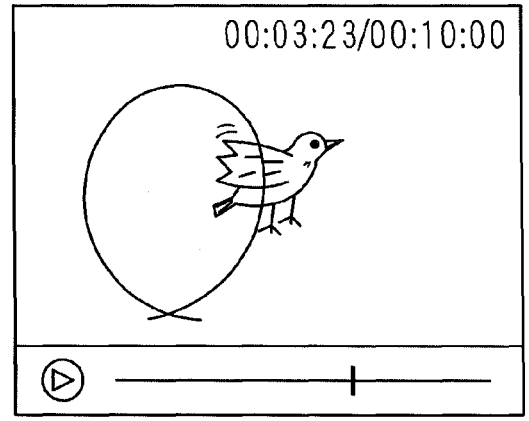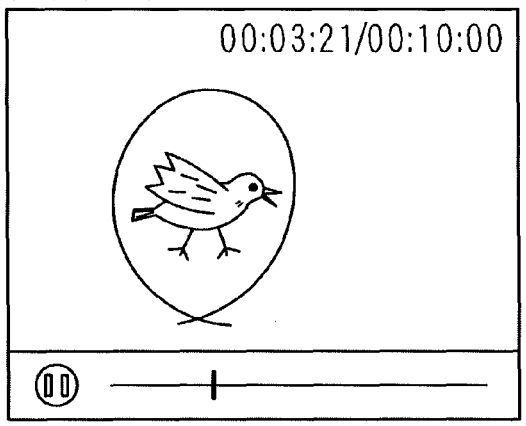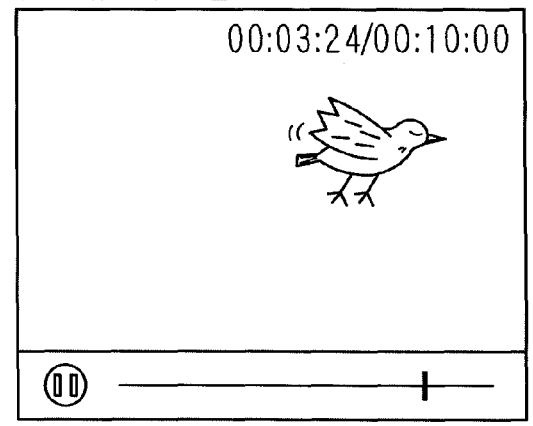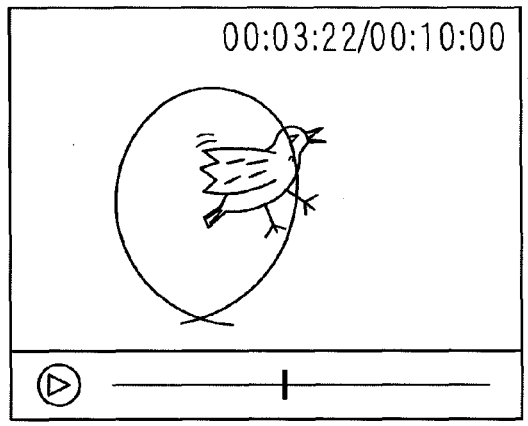

FIG. 11

| | | | | |
|---|---|---|---|---|
| HEADER | DATA ATTRIBUTES | FILE NAME | | |
| | | PATH FOR THE SAVING LOCATION | | |
| | | FILE TYPE | | |
| | | TOTAL TIME LENGTH | | |
| | HANDWRITING ATTRIBUTES | FILE NAME | | |
| | | PATH FOR THE SAVING LOCATION | | |
| | | THE TOTAL NUMBER OF PAGES | | |
| | | OBJECT INFORMATION | OBJECT 1 | COORDINATE |
| | | | | START TIME |
| | | | | END TIME |
| | | | OBJECT 2 | COORDINATE |
| | | | | START TIME |
| | | | | END TIME |
| | | | OBJECT 3 | COORDINATE |
| | | | | START TIME |
| | | | | END TIME |
| | | | ⋮ | |
| OBJECT DATA | OBJECT 1 | DATA | | |
| | OBJECT 2 | DATA | | |
| | OBJECT 3 | DATA | | |
| | ⋮ | | | |

INPUT/OUTPUT APPARATUS FOR DISPLAYING SUPERPOSED IMAGES INCLUDING A HANDWRITTEN IMAGE

CROSS-REFERENCE TO RELATED APPLICATIONS

This Nonprovisional application claims priority under 35 U.S.C. §119(a) on Patent Application No. 2013-017478 filed in Japan on Jan. 31, 2013, the entire contents of which are hereby incorporated by reference.

BACKGROUND

1. Technical Field

The present invention relates to an input/output apparatus capable of inputting a handwritten character or figure to be superposed onto any image displayed on a display unit.

2. Description of Related Art

An information processing apparatus such as a personal computer (PC) is capable of, not only inputting data using a keyboard, but also inputting a handwritten character or the like using a pointing device such as a mouse or a tablet. For example, when drawing a picture using a graphic software, the user inputs a character or figure by handwriting through a pointing device. Japanese Patent Application Laid-Open No. 2006-164148 describes a technique of creating data in which a handwritten image formed of a character or drawing which is input by handwriting is combined with an image of a spread sheet in order to edit a spread sheet, such as an order slip. Furthermore, some information processing apparatuses include, not limited to the case where a picture is drawn, a function of inputting a handwritten character or figure while displaying any image on a display unit. For example, a touch panel integrated with a display unit is used to input and display a handwritten image superposed onto an image displayed on the display unit.

SUMMARY OF THE INVENTION

With the technique as described in Japanese Patent Application Laid-Open No. 2006-164148, in which a displayed image and a handwritten image may synthesized to create data, such a problem arises that specific data has to be handled by specific software and that a handwritten image may not be input onto any image. Moreover, with the conventional technique in which a handwritten image is input to be superposed onto any image displayed on a display unit, the data which is a basis for the image is irrelevant to the handwritten image. When, therefore, an image to be displayed on the display unit is changed, a handwritten image remains displayed, causing a problem in that the displayed image is not properly associated with the handwritten image.

The present invention has been made in view of the above circumstances, and has an object to provide an input/output apparatus which can maintain the association between a handwritten image and any image to be displayed on a display unit.

An input/output apparatus according to the present invention is characterized comprising: a storage unit; a display unit; a handwriting input unit to which a handwritten image is input; a first display control unit displaying on the display unit, when a handwritten image is input through the handwriting input unit while an image based on data stored in the storage unit is being displayed on the display unit, the handwritten image in addition to the image based on the data; a handwritten data creation unit creating handwritten data that includes data specifying information specifying the data stored in the storage unit and represents the handwritten image input through the handwriting input unit, and storing the created handwritten data in the storage unit; a first termination unit terminating the display of the handwritten image when the display of the image based on the data stored in the storage unit is terminated; a reading-out unit reading out, when the handwritten data stored in the storage unit is read out, data specified by the data specifying information included in the read-out handwritten data; and a second display control unit displaying on the display unit an image based on the data read out by the reading-out unit and a handwritten image based on the handwritten data.

The input/output apparatus according to the present invention is characterized by further comprising: a synthesizing unit creating synthesized data representing an image obtained by synthesizing the image based on the data stored in the storage unit and the handwritten image; and a third display control unit displaying an image based on the synthesized data on the display unit.

The input/output apparatus according to the present invention is characterized in that the handwritten data creation unit creates, when a handwritten image is input through the handwriting input unit in a state where the image based on the data stored in the storage unit includes a plurality of images and one of the plurality of images is displayed on the display unit, handwritten data including association information in which the handwritten image is associated with said one image, the apparatus further comprising: a fourth display control unit displaying on the display unit one image based on data representing a plurality of images and a handwritten image associated with said one image on the basis of the association information included in the handwritten data; and a second termination unit terminating, when the display of said one image is terminated and another image among the plurality of images is displayed on the display unit, the display of the handwritten image.

The input/output apparatus according to the present invention is characterized by further comprising a fifth display control unit displaying, when the display of said one image is terminated and said another image is displayed on the display unit, a handwritten image associated with said another image on the basis of the association information, in addition to said another image.

The input/output apparatus according to the present invention is characterized in that the handwritten data creation unit creates, when the image based on the data stored in the storage unit is a moving image and a handwritten image is input through the handwriting input unit while the moving image is being displayed on the display unit, handwritten data including moving image association information in which the handwritten image is associated with a segment in the moving image, the apparatus further comprising a sixth display control unit displaying, when a segment associated with a handwritten image on the basis of the moving image association information included in the handwritten data is displayed while the moving image is being displayed on the display unit, the handwritten image in addition to the moving image on the display unit.

The input/output apparatus according to the present invention is characterized by further comprising a stop unit stopping a moving image when a handwritten image is input through the handwriting input unit while the moving image is being displayed on the display unit, wherein the handwritten data creation unit associates the handwritten image with a segment of the moving image being displayed on the display unit during the moving image is stopped.

The input/output apparatus according to the present invention is characterized by further comprising a third termination unit terminating the display of the handwritten image after the handwritten image is displayed on the display unit for a predetermined period of time in addition to the moving image while the moving image is being displayed on the display unit.

According to the present invention, the input/output apparatus is capable of, for example, saving an input handwritten image while maintaining the association between any image and the handwritten image and of easily reproducing an image obtained by superposing the handwritten image onto the image, which presents beneficial effects.

The above and further objects and features of the invention will more fully be apparent from the following detailed description with accompanying drawings.

BRIEF DESCRIPTION OF THE SEVERAL VIEWS OF THE DRAWINGS

FIG. 5 is a schematic view illustrating an example of an image based on general data;

FIG. 7 is a schematic view illustrating an example of an image after a page is changed;

FIG. 9 is a conceptual view illustrating an example of a file format of handwritten data;

FIG. 10A is a schematic view illustrating an example of a moving image;

FIG. 10B is a schematic view illustrating an example of a moving image;

FIG. 10C is a schematic view illustrating an example of a moving image;

FIG. 10D is a schematic view illustrating an example of a moving image;

FIG. 10E is a schematic view illustrating an example of a moving image;

FIG. 11 is a conceptual view illustrating an example of a file format of handwritten data associated with a moving image.

DETAILED DESCRIPTION

The present invention will be described below in detail with reference to the drawings illustrating embodiments thereof.

Figure 1:
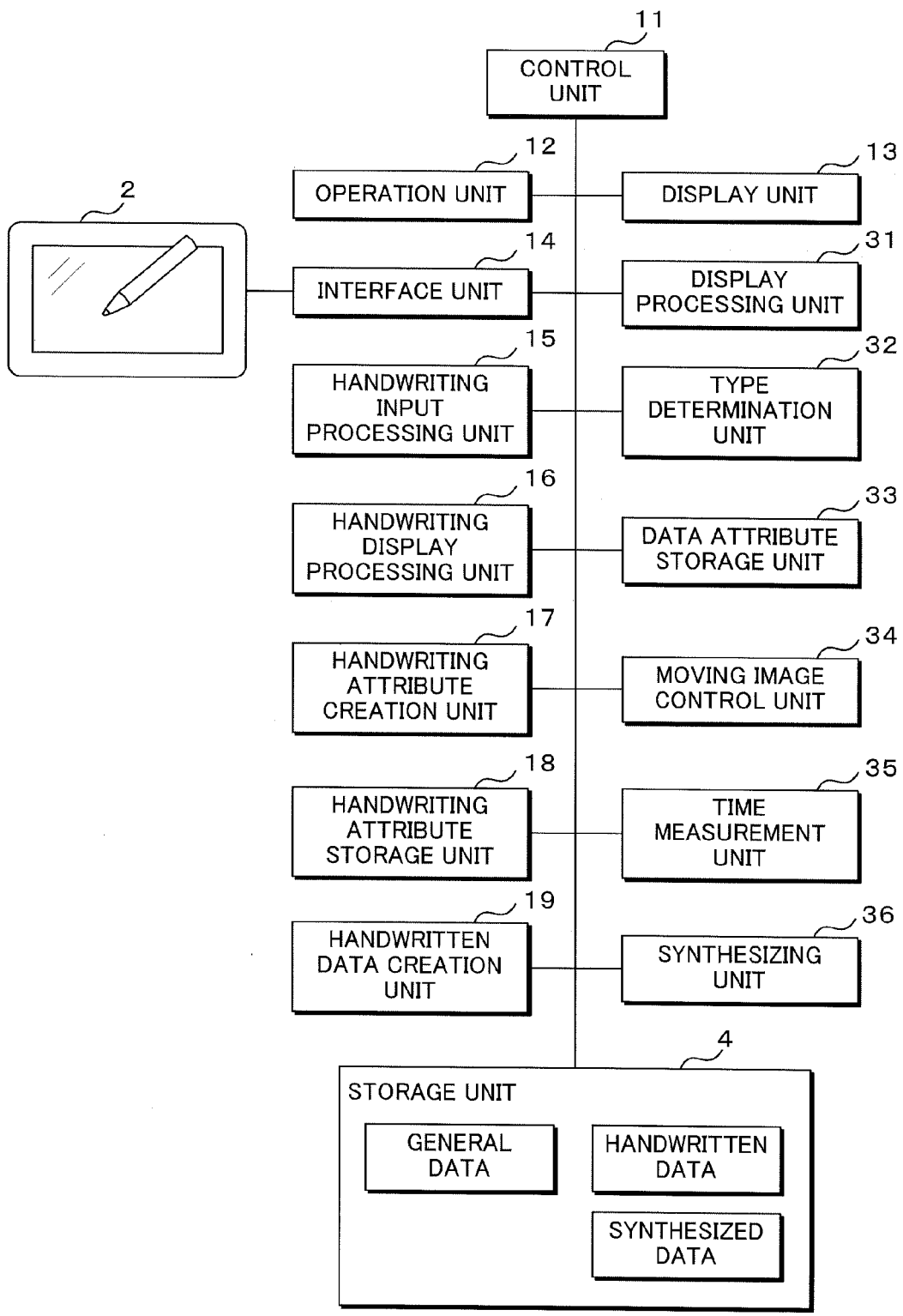
FIG. 1 is a block diagram illustrating a functional configuration of the inside of an input/output apparatus.

FIG. 1 is a block diagram illustrating a functional configuration of the inside of an input/output apparatus. The input/output apparatus is constituted with an information processing device including a display unit 13 such as a liquid-crystal display, and a storage unit 4 such as a hard disk. The input/output apparatus includes a handwriting input device 2 such as a tablet, and displays an image based on data stored in the storage unit 4 on the display unit 13 while performing handwriting input using the handwriting input device 2. The input/output apparatus includes a control unit 11 controlling the operation of each unit in the input/output apparatus, an operation unit 12 such as a keyboard accepting operation from a user, and an interface unit 14 to which the handwriting input device 2 is connected. The handwriting input device 2 receives handwriting input of a handwritten image formed of an object such as a character or a figure written or drawn with a pen or a finger by the user, and inputs data indicating the content input by handwriting to the interface unit 14.

The input/output apparatus also includes a handwriting input processing unit 15 performing processing of recognizing the content input by handwriting from the data input to the interface unit 14 from the handwriting input device 2, and a handwriting display processing unit 16 making the display unit 13 display the handwritten image formed of an object input by handwriting. The interface unit 14 and the handwriting input processing unit 15 corresponds to a handwriting input unit. The input/output apparatus further includes a handwriting attribute creation unit 17 creating an attribute of a handwritten image, such as a position of the handwritten image, and a handwriting attribute storage unit 18 storing information indicating the attributes for a handwritten image. Moreover, the input/output apparatus includes a handwritten data creation unit 19 creating handwritten data representing a handwritten image.

The input/output apparatus further includes a display processing unit 31 making the display unit 13 display an image based on the data stored in the storage unit 4, a type determination unit 32 determining a type of an image, and a data attribute storage unit 33 storing information indicating an attribute of data which is a basis for an image. The input/output apparatus also includes a moving image control unit 34 performing processing of controlling a moving image by, for example, stopping the moving image which is being played, while the moving image is being displayed on the display unit 13, and a time measurement unit 35 measuring play time of each segment of a moving image while the moving image is being played. Moreover, the input/output apparatus includes a synthesizing unit 36 creating a synthesized image by synthesizing a handwritten image with an image based on general data which is not handwritten data. The storage unit 4 stores handwritten data, synthesized data representing a synthesized image and other general data. The general data may be, for example, a file of a word processor or a file of a spread sheet.

The control unit 11 is constituted by including a processor performing arithmetic operation, and a memory storing a program necessary for arithmetic operation, various kinds of data and temporary information associated with arithmetic operation. Each of the handwriting attribute storage unit 18 and data attribute storage unit 33 is constituted by a memory. Each of the handwriting input processing unit 15, handwriting display processing unit 16, handwriting attribute creation unit 17, handwritten data creation unit 19, display processing unit 31, type determination unit 32, moving image control unit 34, time measurement unit 35 and synthesizing unit 36 is constituted by a processing circuit including a processor and a memory. It is noted that a part of these units may be configured with software.

Figure 2:
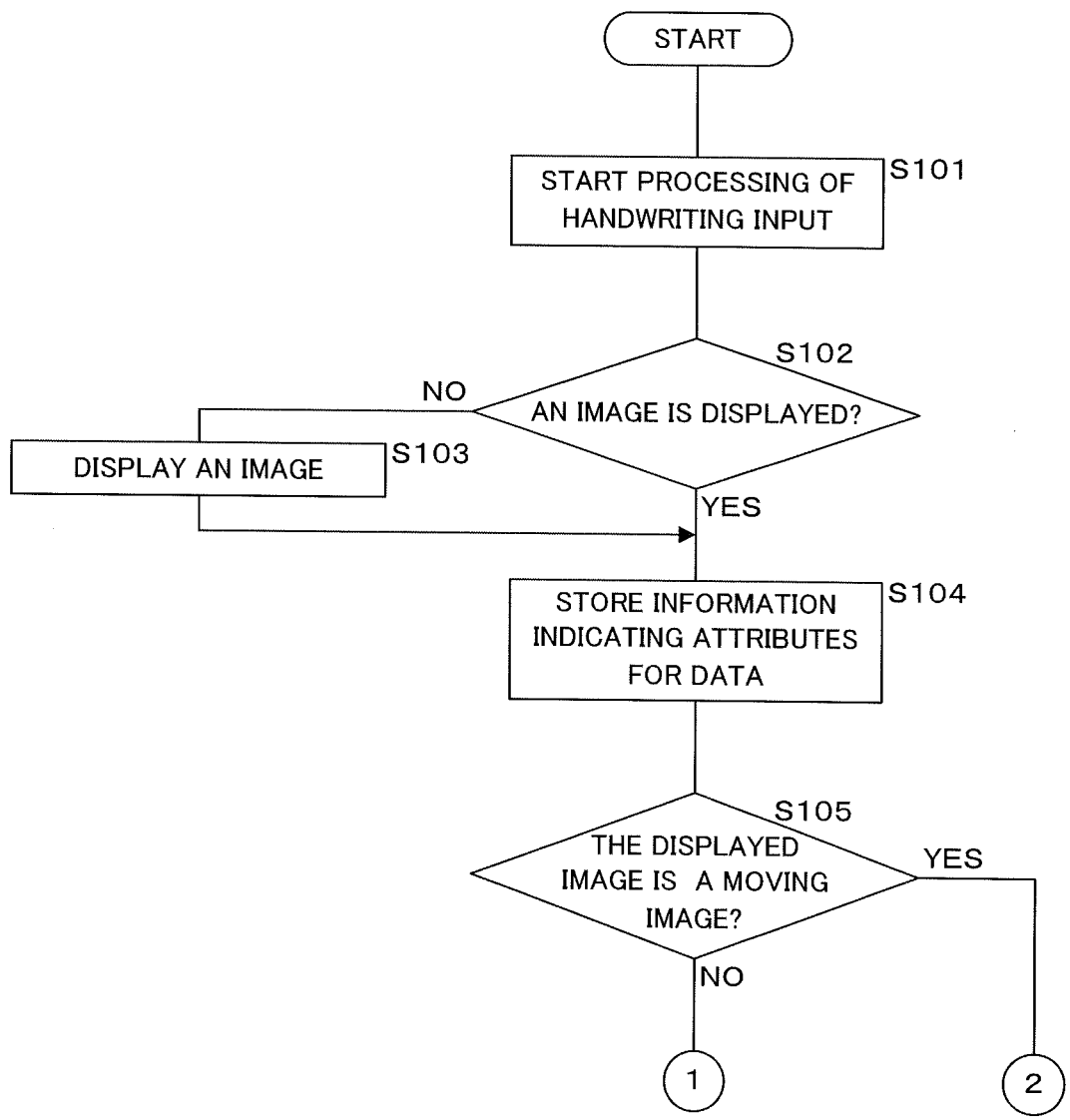
FIG. 2 is a flowchart illustrating a processing procedure of handwriting input performed by an input/output apparatus.
Figure 3:
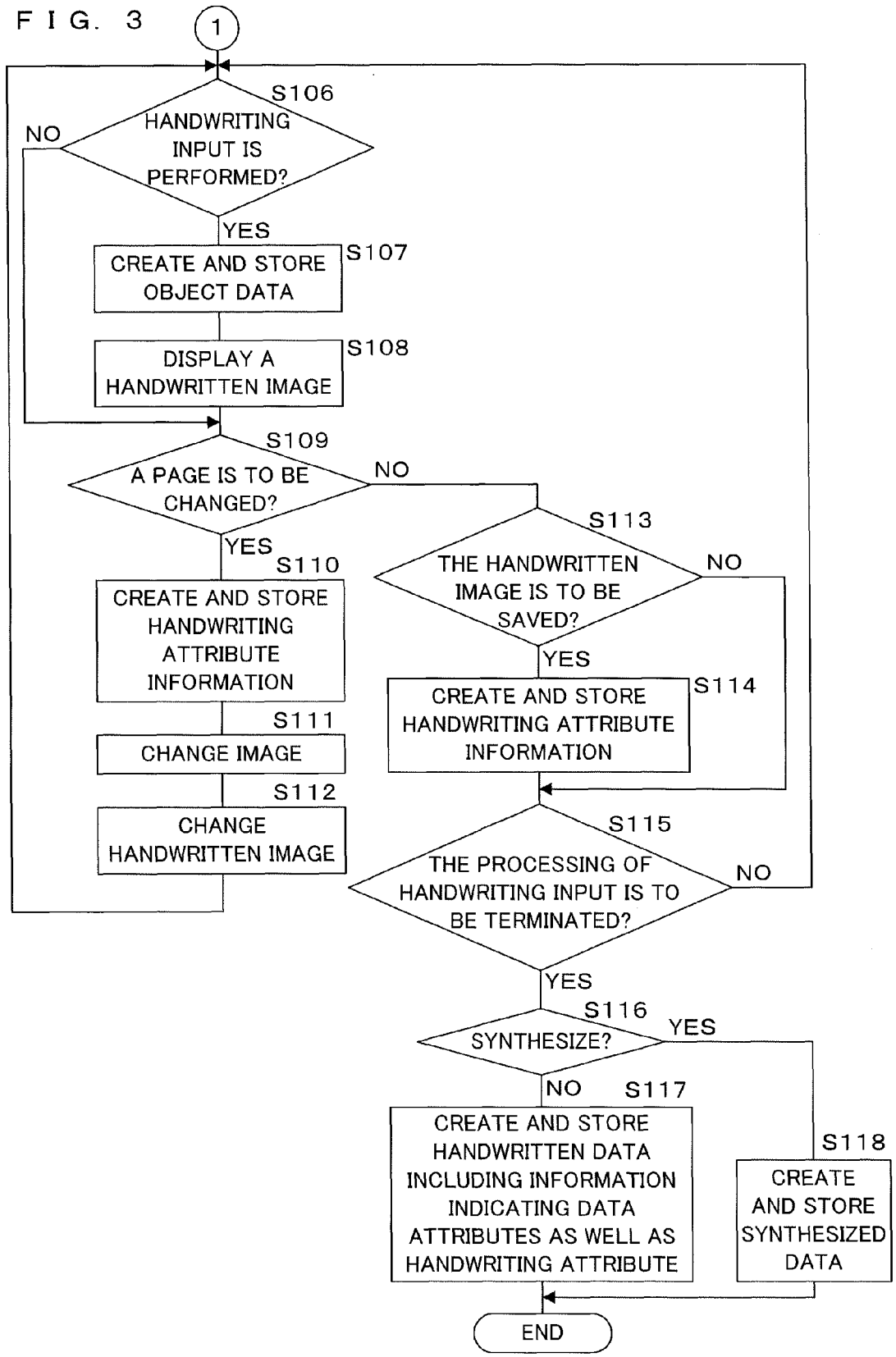
FIG. 3 is a flowchart illustrating a processing procedure of handwriting input performed by an input/output apparatus.
Figure 4:
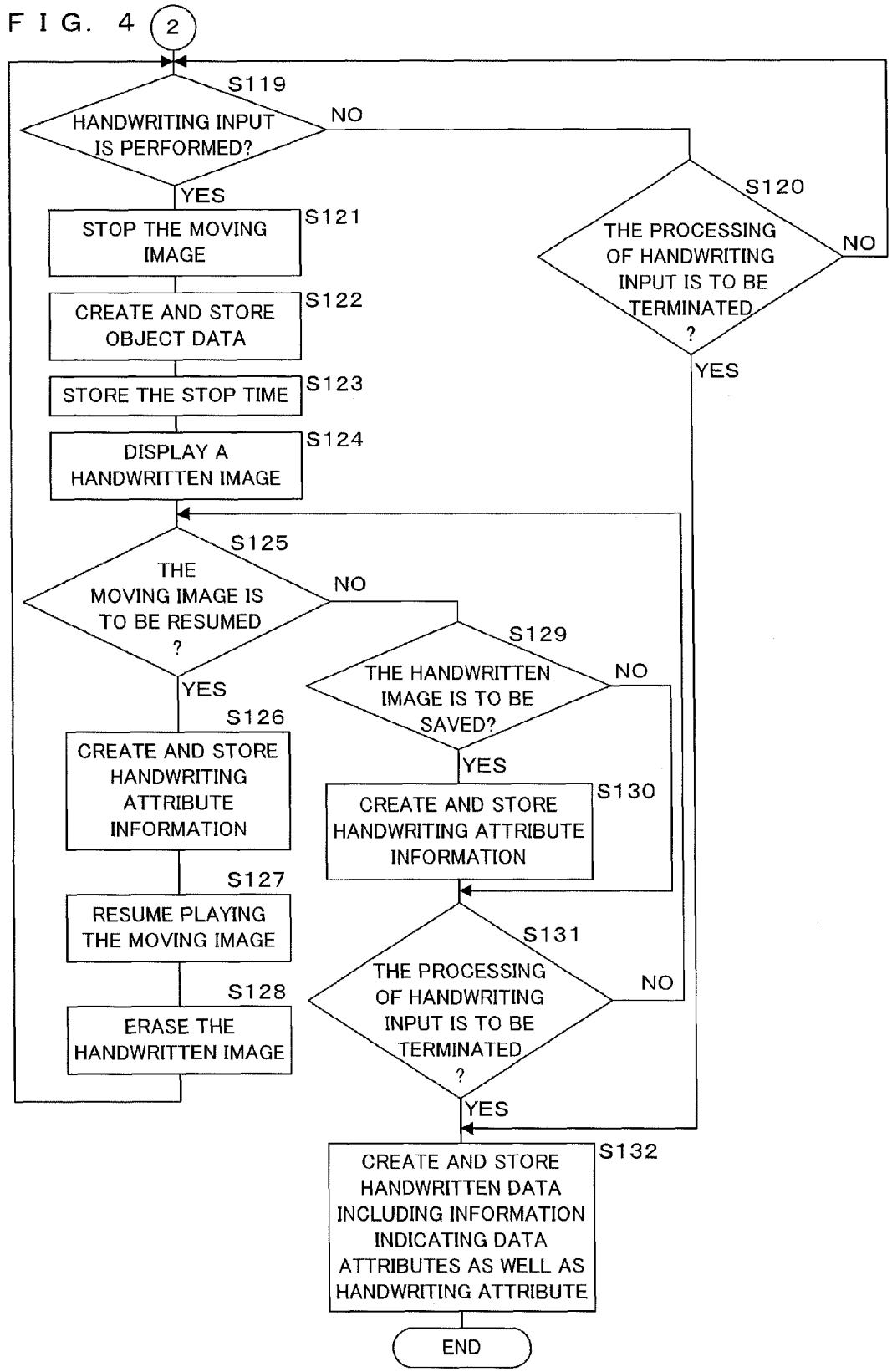
FIG. 4 is a flowchart illustrating a processing procedure of handwriting input performed by an input/output apparatus.

FIGS. 2, 3 and 4 show a flowchart illustrating a processing procedure of handwriting input performed by an input/output apparatus. The control unit 11 starts processing of handwriting input by, for example, starting execution of a specific program (S101). The control unit 11 subsequently determines whether or not an image based on general data stored in the storage unit 4 is displayed on the display unit 13 (S102). If no image is displayed (NO at S102), the control unit 11 specifies general data by, for example, accepting operation from a user at the operation unit 12, and the display processing unit 31 reads out the specified general data from the storage unit 4 and makes the display unit 13 display an image based on the read-out general data (S103). An image of a text, a drawing or the like is displayed on the display unit 13. FIG. 5 is a schematic view illustrating an example of an image based on general data. FIG. 5 illustrates an example where an image of a spread sheet is displayed.

If an image is displayed at step S102 (YES at S102), or after an image is displayed at step S103, the data attribute storage unit 33 stores information indicating attributes for data which is a basis for the displayed image (S104). The attributes for data correspond to, for example, a file name of data, a path for a file and a type of a file. Moreover, when data is able to display more than one pages of images, such as a word processor or a spread sheet, the data attributes include the total number of pages. The type determination unit 32 subsequently determines whether or not the displayed image is a moving image (S105). For example, the type determination unit 32 makes a determination based on the information stored in the data attribute storage unit 33.

If the image is a static image (NO at S105), the control unit 11 waits for handwriting input performed through the handwriting input device 2 (S106). The user operates the handwriting input device 2 while viewing the image displayed on the display unit 13, to input a character or figure by handwriting to be superposed onto the displayed image. The handwriting input device 2 inputs data indicating the content input by handwriting to the interface unit 14. If handwriting input is performed (YES at S106), the handwriting input processing unit 15 creates object data representing an object such as a character or figure input by handwriting based on the data input from the handwriting input device 2, and stores the created object data (S107). The handwriting display processing unit 16 makes the display unit 13 display a handwritten image based on the object data in addition to the image based on general data (S108).

Figure 6:
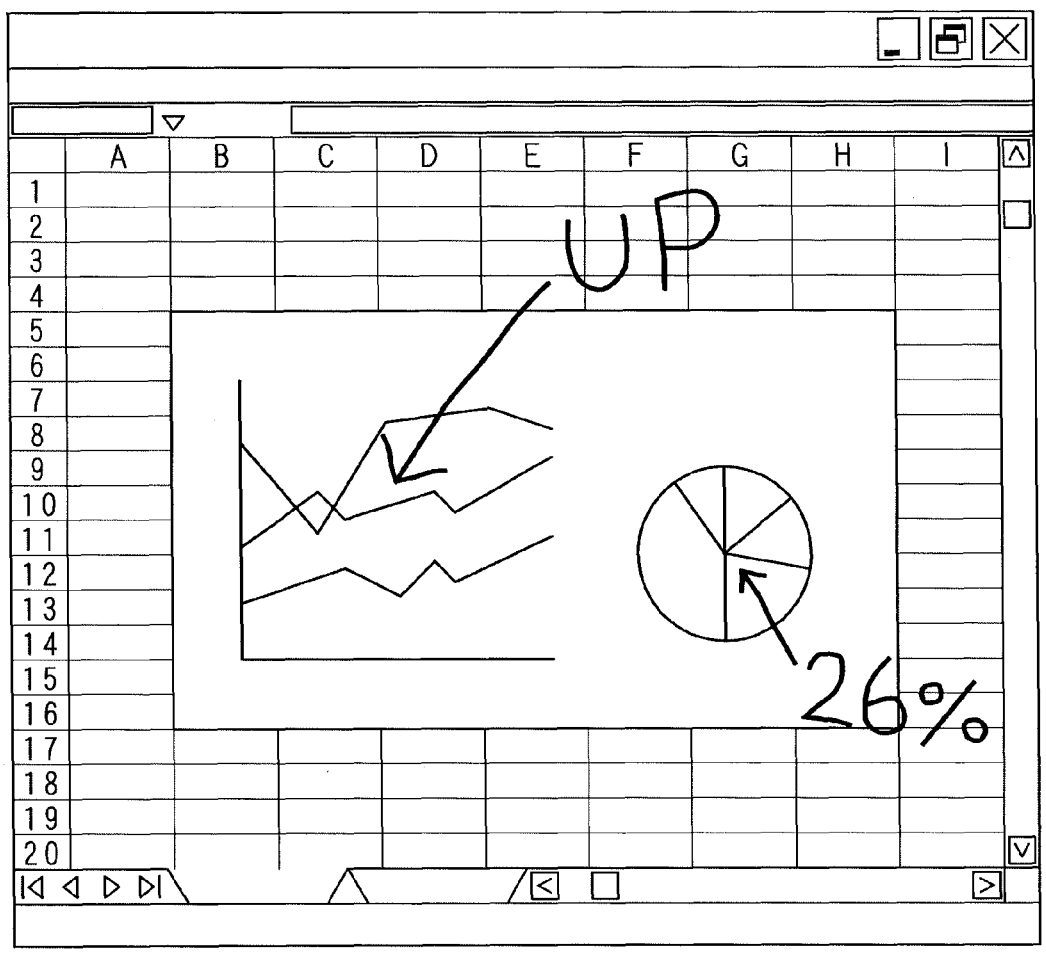
FIG. 6 is a schematic view illustrating an example of a handwritten image.

FIG. 6 is a schematic view illustrating an example of a handwritten image. The example in FIG. 6 shows an image obtained by the user performing handwriting input while viewing the image shown in FIG. 5 and a handwritten image is displayed in addition to the image shown in FIG. 5. The handwritten image includes one or more objects. In FIG. 6, a handwritten image including the text "UP" with an arrow as well as the text "26%" with an arrow are shown. The handwritten image may be one object as a whole. Also, each of the texts "UP" with an arrow and "26%" with an arrow may be one object. For example, when "26%" with an arrow is input by handwriting while the handwritten image of "UP" with an arrow is being displayed, a handwritten image including the two objects is displayed. Moreover, each of the arrows as well as the characters "U" and "P" may be an independent object.

After step S108 is terminated, or when handwriting input is not performed at step S106 (NO at S106), the control unit 11 determines whether or not a page is to be changed for the image based on general data (S109). For example, when the user operates the operation unit 12 to input an instruction for changing a page, the control unit 11 determines that a page is to be changed. Furthermore, when the image based on general data has only one page, the control unit 11 determines that a page is not to be changed. If a page is to be changed (YES at S109), the handwriting attribute creation unit 17 creates handwriting attribute information indicating the attributes for the handwritten image which is being displayed, and the handwriting attribute storage unit 18 stores handwriting attribute information (S110). The attributes for the handwritten image include the name of an object included in the handwritten image, the page number of the image displayed with an addition of the handwritten image, the position of an object and the like. The page number of the image is included in the attribute for the handwritten image, so that the image indicated by the page number may be associated with the handwritten image. It is noted that the processing of step S110 is not substantially performed in the state where no handwritten image is displayed. The display processing unit 31 subsequently changes the image to be displayed on the display unit 13 to an image of a different page (S111), and the handwriting display processing unit 16 changes the handwritten image to be displayed on the display unit 13 (S112). After step S112 is terminated, the control unit 11 returns the processing to step S106.

Figure 8:
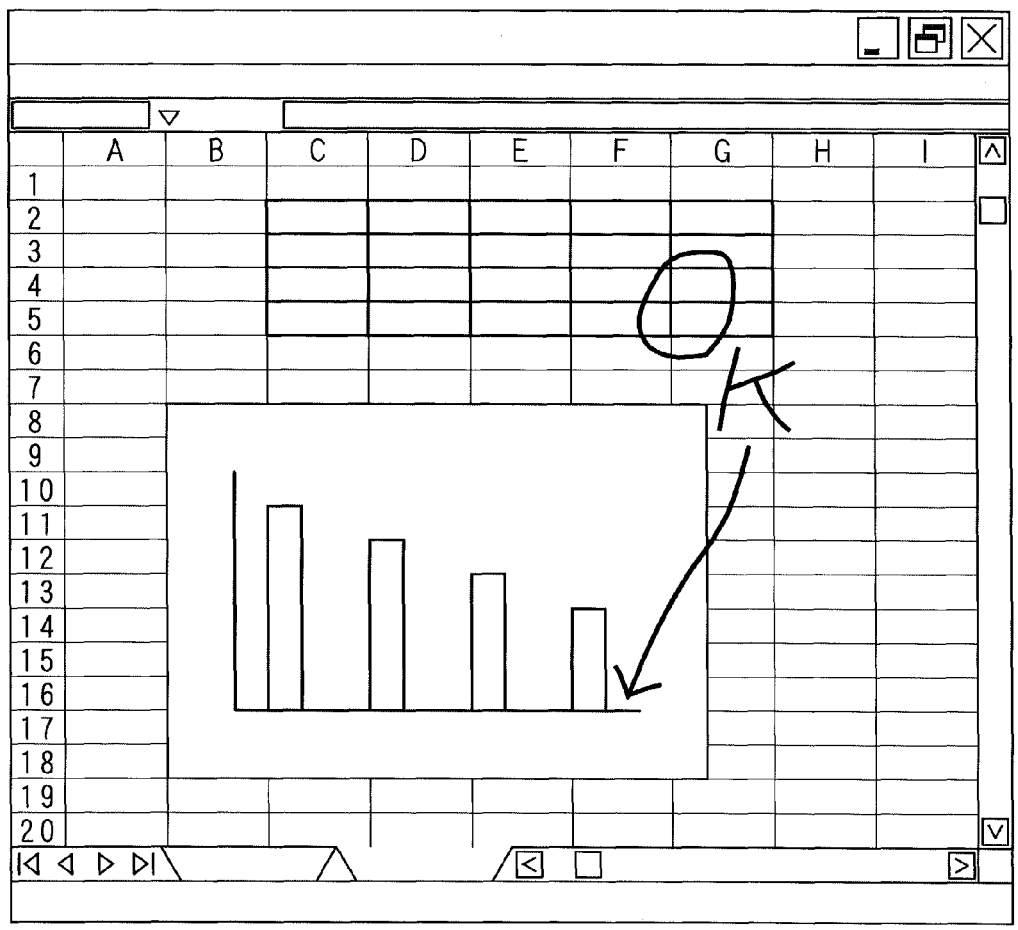
FIG. 8 is a schematic view illustrating an example of a handwritten image added to the image after a page is changed.

At step S112, the handwritten image displayed in addition to the image on the page before change is erased. Moreover, when no handwritten image is associated with the image on the page after change, no handwritten image is displayed. When a handwritten image is associated with the image on the page after change, the associated handwritten image is displayed. FIG. 7 is a schematic view illustrating an example of an image after a page is changed. An image different from the image before change is displayed, while the handwritten image displayed together with the image before change is erased. When, at step S109, a page is changed to be returned to the former page after the processing is returned to step S106, the image on the former page is displayed at step S111, and a handwritten image associated with the image on the former page is added and displayed. At step S112, the handwriting display processing unit 16 refers to the handwriting attribute information stored in the handwriting attribute storage unit 18, to determine whether or not a handwritten image associated with the image after change is present, and makes the display unit 13 display the associated handwritten image based on the object data stored in the handwriting input processing unit 15. Furthermore, after the processing is returned to step S106, it is possible to perform handwriting input on the image after the change of page. FIG. 8 is a schematic view illustrating an example of a handwritten image added to the image after a page is changed. The example here shows that a handwritten image is added to the image shown in FIG. 7. Accordingly, when more than one pages of images are displayed based on general data, it is possible to input different handwritten images for the images displayed on different pages.

If a page is not to be changed at step S109 (NO at S109), the control unit 11 determines whether or not the handwritten image is to be saved (S113). For example, the control unit 11 determines that the image is to be saved when the user operates the operation unit 12 to input an instruction for saving, and that the image is not to be saved when the user does not input the instruction for saving. For another example, the control unit 11 may determine that the image is to be saved when a certain period of time has elapsed since the handwriting input is performed. For another example, the control unit 11 may determine that the handwritten image is to be saved when the general data which is a basis for the displayed image is updated. When the handwritten image is to be saved (YES at S113), the handwriting attribute creation unit 17 creates handwriting attribute information, and the handwriting attribute storage unit 18 stores handwriting attribute information (S114).

After step S114 is terminated, or when a handwritten image is not to be saved at step S113 (NO at S113), the control unit 11 determines whether or not the processing of handwriting input is to be terminated (S115). For example, when the user operates the operation unit 12 to input an instruction for terminating the processing of handwriting input, the control unit 11 determines that the processing is to be terminated. For another example, when the display of an image based on general data is terminated, the control unit 11 determines that the processing of handwriting input is also to be terminated. When the processing of handwriting input is not to be terminated (NO at S115), the control unit 11 returns the processing to step S106. When the processing of handwriting input is to be terminated (YES at S115), the control unit 11 determines whether or not an image based on general data is to be synthesized with a handwritten image (S116). For example, when the user operates the operation unit 12 to input an instruction for synthesizing the images, the control unit 11 determines that the images are to be synthesized. For another example, whether or not synthesizing is to be performed may be preset, data indicating the preset details may be stored in the storage unit 4, and the control unit 11 makes determination by referring to the data stored in the storage unit 4.

When the synthesizing is not to be performed (NO at S116), the handwritten data creation unit 19 creates handwritten data including information indicating the attributes for data stored in the data attribute storage unit 33 as well as handwriting attribute information stored in the handwriting attribute storage unit 18, and representing one or more handwritten images, and stores the created handwritten data in the storage unit 4 (S117). After step S117 is terminated, the control unit 11 terminates the processing of handwriting input.

FIG. 9 is a conceptual view illustrating an example of a file format of handwritten data. The handwritten data includes object data representing an object, and a header. The header includes data attributes for general data which is a basis for the image displayed on the display unit 13 when handwriting input is performed, and handwriting attributes. The data attributes include a file name of general data, a path for the saving location of general data, a file type, the total number of pages, and the like. The data attributes included in the header correspond to data specifying information specifying general data which is a basis for the image to be displayed with a handwritten image, among the data stored in the storage unit 4.

Moreover, the handwriting attributes include a file name of handwritten data, a path for the saving location of handwritten data, and the total number of pages of handwritten images. The handwriting attributes further include object information related to one or more objects constituting a handwritten image. The object information includes, for each object, a page number of an image in which an object is input by handwriting, and the coordinates indicating the position of the object in the image. By recording the page number for each object, a handwritten image is associated with one of the plurality of images based on general data. In other words, the object information corresponds to association information in the present invention. When the handwriting attributes include object information concerning an object associated with more than one pages, and when the handwritten data includes object data concerning more than one objects, the handwritten data represents more than one handwritten images.

When the control unit 11 determines that the synthesizing is performed at step S116 (YES at S116), the handwritten data creation unit 19 creates synthesized data representing a synthesized image in which an image based on general data is synthesized with a handwritten image, and stores the synthesized data in the storage unit 4 (S118). After step S118 is terminated, the control unit 11 terminates the processing of handwriting input.

When an image is a moving image at step S105 (YES at S105), the control unit 11 waits for handwriting input using the handwriting input device 2 (S119). When handwriting input is not performed (NO at S119), the control unit 11 determines whether or not the processing of handwriting input is to be terminated (S120). If the processing of handwriting input is not to be terminated (NO at S120), the control unit 11 returns the processing to step S119.

When handwriting input is performed at step S119 (YES at S119), the moving image control unit 34 temporarily stops the moving image displayed on the display unit 13 (S121). In the state where the moving image is stopped, a static image consisting a segment of the moving image in time series is displayed on the display unit 13. The handwriting input processing unit 15 subsequently creates object data representing an object input by handwriting, based on the data input from the handwriting input device 2, and stores the created object data (S122). The time measurement unit 35 measures stop time indicating the time length of the moving image from the beginning to the stopped segment of the moving image, and stores the stop time (S123). The handwriting display processing unit 16 makes the display unit 13 display a handwriting image in addition to the image displayed on the display unit 13 while the moving image is stopped (S124).

After step S124 is terminated, the control unit 11 determines whether or not the stopped moving image is to be resumed (S125). For example, the control unit 11 determines that the moving image is to be resumed when the user operates the control unit 12 to input an instruction for resumption, and determines that the moving image is not to be resumed when the instruction for resumption is not input. For another example, the control unit 11 may determine that the moving image is to be resumed when a certain period of time has elapsed since the moving image is stopped. When the moving image is to be resumed (YES at S125), the handwriting attribute creation unit 17 creates handwriting attribute information indicating the attributes for the handwritten image in the display, and the handwriting attribute storage unit 18 stores the handwriting attribute information (S126). The attributes for the handwritten image include the name of an object, stop time for the segment of a moving image to which the handwritten image is added, the position of the object, and the like. By including the stop time in the attributes for a handwritten image, the handwritten image is associated with the segment of the moving image indicated by the stop time. The moving image control unit 34 then resumes playing the moving image displayed on the display unit 13 (S127), and the handwriting display processing unit 16 erases the handwritten image after the handwritten image is displayed on the display unit 13 for a predetermined period of time (S128). After step S128 is terminated, the control unit 11 returns the processing to step S119.

FIGS. 10A, 10B, 10C, 10D and 10E illustrate schematic views illustrating an example of a moving image. Each of the figures illustrates a segment of the moving image in time series, showing an example where a moving image is played in the order of FIGS. 10A, 10B, 10C, 10D and 10E. The digits in each figure indicate the time length from the beginning to the displayed scene and the time length of the entire moving image. For example, the digits in FIG. 10A indicate that the time length of the entire moving image is ten minutes, while the image shown in FIG. 10A is a scene at a time point when one minute and two seconds have passed from the beginning of the moving image. FIG. 10B illustrates the state where handwriting input is performed. The moving image is stopped, while a handwritten image is added to the displayed image. FIGS. 10C and 10D show images after the moving image is resumed. The handwritten image is displayed at the same position, while the moving image changes over time. In the illustrated example, the handwritten image is displayed from the time point of three minutes and two seconds to the time point of three minutes and twenty-three seconds in the moving image. FIG. 10E shows an image after the handwritten image is erased. The handwritten image is erased while the moving image continues to be displayed. It is also possible to further perform handwriting input after the processing is returned to step S119. In such as case, handwritten images are associated with more than one segments of the moving image in time series.

If the moving image is not to be resumed at step S125 (NO at S125), the control unit 11 determines whether or not the handwritten image is to be saved (S129). If the moving image is to be saved (YES at S129), the handwriting attribute creation unit 17 creates handwriting attribute information, and the handwriting attribute storage unit 18 stores the handwriting attribute information (S130). After step S130 is terminated, or when the handwritten image is not to be saved at step S129 (NO at S129), the control unit 11 determines whether or not the processing of handwriting input is to be terminated (S131). If the processing of handwriting input is not to be terminated (NO at S131), the control unit returns the processing to step S125. If the processing of handwriting input is to be terminated (YES at S120), or when the processing of handwriting input is to be terminated at step S120 (YES at S131), the handwritten data creation unit 19 creates handwritten data which includes information indicating the attributes for data stored in the data attribute storage unit 33 as well as handwriting attribute information stored in the handwriting attribute storage unit 18, and which represents one of more handwritten images, and stores the created handwritten data in the storage unit 4 (S132). After step S132 is terminated, the control unit 11 terminates the processing of handwriting input.

FIG. 11 is a conceptual view illustrating an example of a file format of handwritten data associated with a moving image. The header includes data attributes for general data which is a basis for the moving image. The data attributes include a file name of general data, a path for the saving location of general data, a file type and the total time length of the moving image. The data attributes correspond to data specifying information for specifying general data which is a basis for the moving image to be displayed together with a handwritten image, among the data stored in the storage unit 4. The handwriting attributes include a file name of the handwritten data, a path for the saving location of handwritten data, and the total number of pages of handwritten images. The object information includes, for each object, start time indicating the time length of the moving image from the beginning of the moving image to the segment where the object starts being displayed, end time indicating the time length of the moving image from the beginning of the moving image to the segment where the object finishes being displayed, and coordinates. The start time corresponds to a value equal to the stop time. The end time corresponds to a value obtained by adding a predetermined time period to the start time. In the example shown in FIGS. 10A to 10E, the start time is three minutes and twenty-one seconds, whereas the end time is three minutes and twenty-three seconds. It is noted that the end time may be designated by the user. The start time and end time are recorded for each object, so that the handwritten image is associated with a segment of the moving image in time series based on general data. Thus, in the case of a moving image, the object information corresponds to moving image association information.

Figure 12:
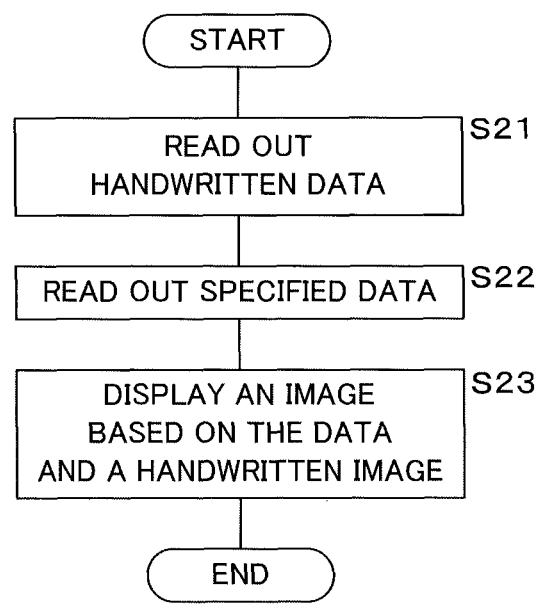
FIG. 12 is a flowchart illustrating a processing procedure of displaying a handwritten image performed by an input/output apparatus.

FIG. 12 is a flowchart illustrating a processing procedure of displaying a handwritten image performed by an input/output apparatus. The control unit 11 reads out handwritten data stored in the storage unit 4 (S21). For example, the user operates the operation unit 12 to input an instruction for specifying handwritten data, and the control unit 11 reads out the specified handwritten data from the storage unit 4. The control unit 11 refers to the data attributes included in the header of the handwritten data to read out from the storage unit 4 the general data specified by the data attributes (S22). The display processing unit 31 makes the display unit 13 display an image based on the read-out data, while the handwriting display processing unit 16 makes the display unit 13 display a handwritten image based on the handwritten data (S23).

At step S23, the input/output apparatus displays an image obtained by adding a handwritten image to the image based on general data, as shown in FIG. 6 or 8. The handwriting display processing unit 16 refers to the header of the handwritten data to display a handwritten image associated with the image which is being displayed. More specifically, the handwriting display processing unit 16 performs processing of displaying an object, in addition to an image of a page number recorded in the object information for the object, at a position indicated by the coordinates recorded in the object information. In the case where the page of the image based on general data is changed, the handwritten image displayed in accordance with the page after change is also changed. When the image based on general data is a moving image, the handwriting display processing unit 16 makes the display unit 13 display the handwritten image associated with each segment of the moving image, in addition to the each segment. More specifically, the handwriting display processing unit 16 refers to the header of the handwritten data and performs processing of displaying an object, in addition to the segment specified by the start time and end time recorded in the object information of the object among the segments in time series of the moving image, at the position indicated by the coordinates recorded in the object information. The moving image control unit 34 may or may not stop the moving image when the handwritten image is displayed. After step S23 is terminated, the control unit 11 terminates the processing of displaying the handwritten image. Furthermore, the input/output apparatus is able to read out the synthesized data stored in the storage unit 4 and makes the display unit 13 display the synthesized image based on the read-out synthesized data.

As described above in detail, according to the present embodiment, the input/output apparatus displays, when a handwritten image is input while an image based on any data is being displayed, the handwritten image in addition to the displayed image, and creates handwritten data including data specifying information for specifying data. With the handwriting input device 2, the user can input a handwritten image formed of any character or figure to be superposed onto an image based on any data, and saving the handwritten image is capable. The input/output apparatus terminates the display of the handwritten image when the display of the image superposed by the handwritten image is terminated, and displays the image based on the data specified by the data specifying information included in the handwritten data, when the handwritten image is displayed. Thus, when the image to be displayed on the display unit is changed, the handwritten image is erased, avoiding inappropriate association between the displayed image and the handwritten image. Moreover, the handwritten data includes the information indicating data which is a basis for the image superposed by the handwritten image, enabling the association between the displayed image and the handwritten image to be saved and to easily be reproduced. Furthermore, the handwritten data is created separately from the data which is a basis for the image superposed by the handwritten image, thereby eliminating the need for changing the data which is a basis of the image. Accordingly, the input/output apparatus may maintain the association between any image and a handwritten image when the handwritten image is input while the image is being displayed.

In addition, the input/output apparatus may also create synthesized data representing a synthesized image obtained by synthesizing any image with a handwritten image. The use of synthesized data allows easy reproduction of the image obtained by superposing a handwritten image onto any image. Furthermore, the input/output apparatus may associate a handwritten image with an image on an individual page, when the image based on general data is an image formed by more than one pages such as a spread sheet. When the image to be displayed is changed from an image on one page to an image on another page, a handwritten image to be displayed in addition to the displayed image is also changed. Thus, even in the case where more than one images are displayed based on one piece of data, the association between the respective images and handwritten images may be maintained. Moreover, when the image based on general data is a moving image and when a handwritten image is input during the display of the moving image, the input/output apparatus may associate the handwritten image with a segment in time series of the moving image where the handwritten image is input. When the segment associated with the handwritten image is displayed during the display of the moving image, the input/output apparatus displays the handwritten image in addition to the segment, and does not display the handwritten image when another segment is being displayed. This makes it possible to maintain the association between a handwritten image and each segment included in the moving image. Furthermore, the input/output apparatus stops the moving image when a handwritten image is input during the display of the moving image. This allows the user to easily input the handwritten image.

Though, in the present embodiment, an example where the time length from the beginning of the moving image is used as the information indicating a segment of the moving image in time series, the input/output apparatus may alternatively have a form of using, as the information indicating a segment of the moving image in time series, a frame number indicating the number of frames counted from the beginning of the moving image. Furthermore, the handwriting input device 2 may have a form of a pointing device other than a tablet, such as a touchscreen or a mouse. Also, the display unit 13 may alternatively be a projector. The input/output apparatus may also have a form in which the handwriting input device 2 and the display unit 13 are integrated together. For example, the display unit 13 may be a flat-surface display, and the handwriting input device 2 may be a device for detecting the position of a user's finger or a pen placed on the screen of the display unit 13 displaying an image.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An input/output apparatus, comprising:
   a storage;
   a display;
   a handwriting input to which a handwritten image is input;
   a first display controller configured or programmed to display on the display, when a handwritten image is input through the handwriting input while an image based on data stored in the storage is being displayed on the display, the handwritten image in addition to the image based on the data;
   a handwritten data creation controller configured or programmed to create handwritten data that includes data specifying information specifying the data stored in the storage and represents the handwritten image input through the handwriting input, and to store the created handwritten data in the storage;
   a first termination controller configured or programmed to terminate the display of the handwritten image when the display of the image based on the data stored in the storage is terminated;
   a reading-out controller configured or programmed to read out, when the handwritten data stored in the storage is read out, data specified by the data specifying information included in the read-out handwritten data; and
   a second display controller configured or programmed to display on the display an image based on the data read out by the reading-out controller and a handwritten image based on the handwritten data; wherein
   the handwritten data creation controller is configured or programmed to create, when a handwritten image is input through the handwriting input in a state where the image based on the data stored in the storage includes a plurality of images and one of the plurality of images is displayed on the display, handwritten data including association information in which the handwritten image is associated with said one image,
   the input/output apparatus further comprising:
   a fourth display controller configured or programmed to display on the display one image based on data representing a plurality of images and a handwritten image associated with said one image on the basis of the association information included in the handwritten data; and
   a second termination controller configured or programmed to terminate, when the display of said one image is terminated and another image among the plurality of images is displayed on the display, the display of the handwritten image.

2. The input/output apparatus according to claim 1, further comprising:
   a synthesizing controller configured or programmed to create synthesized data representing an image obtained by synthesizing the image based on the data stored in the storage and the handwritten image; and
   a third display controller configured or programmed to display an image based on the synthesized data on the display.

3. The input/output apparatus according to claim 1, further comprising:
   a fifth display controller configured or programmed to display, when the display of said one image is terminated and said another image is displayed on the display, a handwritten image associated with said another image on the basis of the association information, in addition to said another image.

4. The input/output apparatus according to claim 1, wherein
the handwritten data creation controller is configured or programmed to create, when the image based on the data stored in the storage is a moving image and a handwritten image is input through the handwriting input while the moving image is being displayed on the display, handwritten data including moving image association information in which the handwritten image is associated with a segment in the moving image,
the input/output apparatus further comprising:
a sixth display controller configured or programmed to display, when a segment associated with a handwritten image on the basis of the moving image association information included in the handwritten data is displayed while the moving image is being displayed on the display, the handwritten image in addition to the moving image on the display.

5. The input/output apparatus according to claim 4, further comprising:
a stopping controller configured or programmed to stop a moving image when a handwritten image is input through the handwriting input while the moving image is being displayed on the display,
wherein the handwritten data creation controller is configured or programmed to associate the handwritten image with a segment of the moving image being displayed on the display during the moving image is stopped.

6. The input/output apparatus according to claim 4, further comprising:
a third termination controller configured or programmed to terminate the display of the handwritten image after the handwritten image is displayed on the display for a predetermined period of time in addition to the moving image while the moving image is being displayed on the display.

7. An input/output apparatus, comprising:
a storage;
a display;
a handwriting input to which a handwritten image is input;
a first display controller configured or programmed to display on the display, when a handwritten image is input through the handwriting input while an image based on data stored in the storage is being displayed on the display, the handwritten image in addition to the image based on the data;
a handwritten data creation controller configured or programmed to create handwritten data that includes data specifying information specifying the data stored in the storage and represents the handwritten image input through the handwriting input, and to store the created handwritten data in the storage;
a first termination controller configured or programmed to terminate the display of the handwritten image when the display of the image based on the data stored in the storage is terminated;
a reading-out controller configured or programmed to read out, when the handwritten data stored in the storage is read out, data specified by the data specifying information included in the read-out handwritten data; and
a second display controller configured or programmed to display on the display an image based on the data read out by the reading-out controller and a handwritten image based on the handwritten data; wherein
the handwritten data creation controller is configured or programmed to create, when the image based on the data stored in the storage is a moving image and a handwritten image is input through the handwriting input while the moving image is being displayed on the display, handwritten data including moving image association information in which the handwritten image is associated with a segment in the moving image, and
the input/output apparatus further comprising:
a sixth display controller configured or programmed to display, when a segment associated with a handwritten image on the basis of the moving image association information included in the handwritten data is displayed while the moving image is being displayed on the display, the handwritten image in addition to the moving image on the display.

8. The input/output apparatus according to claim 7, further comprising:
a stopping controller configured or programmed to stop a moving image when a handwritten image is input through the handwriting input while the moving image is being displayed on the display,
wherein the handwritten data creation controller is configured or programmed to associate the handwritten image with a segment of the moving image being displayed on the display during the moving image is stopped.

9. The input/output apparatus according to claim 7, further comprising:
a third termination controller configured or programmed to terminate the display of the handwritten image after the handwritten image is displayed on the display for a predetermined period of time in addition to the moving image while the moving image is being displayed on the display.

* * * * *